United States Patent
Chiba

(10) Patent No.: US 6,656,240 B2
(45) Date of Patent: Dec. 2, 2003

(54) NON-ASBESTOS FRICTION MATERIAL

(75) Inventor: Masanori Chiba, Gunma-ken (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 10/077,976

(22) Filed: Feb. 20, 2002

(65) Prior Publication Data

US 2002/0157321 A1 Oct. 31, 2002

(30) Foreign Application Priority Data

Feb. 20, 2001 (JP) ....................................... 2001-043166

(51) Int. Cl.$^7$ ............................... C09K 3/14; C09C 1/68
(52) U.S. Cl. ............................ 51/307; 51/308; 51/309; 51/298; 106/36; 188/17; 188/12 R; 188/73.1; 188/251 A; 188/251 R
(58) Field of Search .............................. 106/36; 51/307, 51/308, 309, 298; 188/17, 18 R, 73.1, 251 A, 251 R

(56) References Cited

U.S. PATENT DOCUMENTS

| | | | |
|---|---|---|---|
| 3,959,194 A | * | 5/1976 | Adelmann .................. 523/158 |
| 4,137,214 A | | 1/1979 | Sochalski |
| 4,785,029 A | | 11/1988 | Honma et al. |
| 5,866,636 A | | 2/1999 | Nitto et al. |
| 6,413,622 B1 | * | 7/2002 | Kobayashi ............... 428/293.1 |

FOREIGN PATENT DOCUMENTS

| | | |
|---|---|---|
| EP | 1 031 754 A1 | 8/2000 |
| JP | 56 065075 A | 6/1981 |
| JP | 59 074180 A | 4/1984 |
| JP | 6-228539 | 8/1994 |
| JP | 2001-311071 | * 11/2001 |

* cited by examiner

*Primary Examiner*—Michael Marcheschi
(74) *Attorney, Agent, or Firm*—Birch, Stewart, Kolasch & Birch, LLP

(57) ABSTRACT

A non-asbestos friction material is made by molding and curing a composition which includes a fibrous base other than asbestos, a binder, an organic filler, an inorganic filler and an abrasive. The abrasive is composed of one or more inorganic substance selected from among inorganic substances having a Mohs hardness of at least 4.5 and inorganic substances having a Mohs hardness of less than 4.5 and containing at least 50 wt % of a component having a Mohs hardness of at least 4.5. The total amount of organic substances and the total amount of abrasive are in a volumetric ratio of from 1.5/1 to 3.5/1. The friction material thus constituted generates little squeal or other undesirable noise and has a good wear resistance.

8 Claims, No Drawings

NON-ASBESTOS FRICTION MATERIAL

BACKGROUND OF THE INVENTION

1. Field of the Invention

The present invention relates to a non-asbestos friction material which generates little squeal or other undesirable noise and has a good wear resistance.

2. Prior Art

Conventional friction materials contain large amounts of organic fillers such as cashew dust and rubber dust to satisfy performance requirements concerning noise and wear. Abrasives are also included for improving braking effectiveness, but are generally kept to an absolute minimum to avoid adversely impacting the noise performance.

However, this general rule does not apply to certain friction materials used in combination with rotors, drums and the like made of aluminum alloy reinforced with a suitable hard material. Namely, a non-asbestos friction material for such use having added thereto 0.1 to 30 vol % of a hard inorganic substance having a Mohs hardness of at least 6 is disclosed in JP-A 6-228539.

Yet, in the case of iron-based rotors and drums in predominant use today, the incorporation of hard inorganic substances in friction materials exacerbates brake noise characteristics and thus poses a practical problem.

Moreover, where the ease of rust removal is an important concern, the friction material should contain a large amount of abrasive, which undesirably aggravates the brake noise characteristics and attack of the mating surface in friction, resulting in brake squeal and brake judder.

SUMMARY OF THE INVENTION

It is therefore an object of the invention to provide a non-asbestos friction material that generates little squeal and other undesirable brake noise, has a good wear resistance, and in particular is highly suitable for use in combination with a rotor or drum having a mating surface that comes into contact with the friction material and is made of a material selected from among cast iron, cast steel and stainless steel.

The inventor has found that adjusting the ratio between the total amount of organic substances and the total amount of abrasive within the friction material is effective for minimizing attack to the mating surface and holding down the generation of squeal and other undesirable sounds. The use of a combination of two or more abrasives of different Mohs hardnesses is particularly effective.

A non-asbestos friction material is generally obtained by molding and curing a composition comprising a fibrous base other than asbestos, a binder, an organic filler and an inorganic filler. A high-performance non-asbestos friction material is obtained by further incorporating in the composition an abrasive composed of one or more inorganic substance selected from among inorganic substances having a Mohs hardness of at least 4.5 and inorganic substances having a Mohs hardness of less than 4.5 and containing at least 50 wt % of a component having a Mohs hardness of at least 4.5, by adjusting the volumetric ratio of the total amount of organic substances (which is the combined amount of organic fibers within the fibrous base, binder, and organic filler) to the total amount of abrasive (i.e., total organics/total abrasive) within a range of 1.5:1 to 3.5:1, and preferably by using a mixture of two or more abrasive substances having different Mohs hardnesses as the abrasive. The non-asbestos friction material exhibits high performance because the respective components act effectively. When used in combination with a rotor or drum having a mating surface that comes into contact with the friction material and is made of a material selected from among cast iron, cast steel and stainless steel, this non-asbestos friction material minimizes the generation of low-frequency noise during braking and the generation of brake squeal. The non-asbestos friction material is also characterized by little attack to the mating surface and excellent wear resistance. The present invention is predicated on the above finding.

Accordingly, the invention provides a non-asbestos friction material made by molding and curing a composition comprising a fibrous base other than asbestos, a binder, an organic filler and an inorganic filler. The composition includes also an abrasive composed of one or more inorganic substance selected from among inorganic substances having a Mohs hardness of at least 4.5 and inorganic substances having a Mohs hardness of less than 4.5 and containing at least 50 wt % of a component having a Mohs hardness of at least 4.5. A total amount of organic substances and a total amount of abrasive are in a volumetric ratio (total organics/total abrasive) of 1.5/1 to 3.5/1.

Preferably, the abrasive is a mixture of two or more abrasive substances of different Mohs hardnesses selected from the group consisting of zirconium oxide, zirconium silicate, triiron tetraoxide, magnetite, vermiculite, mica, stannic oxide, magnesium oxide (magnesia), iron sulfide, pyrite, ferric oxide (red iron oxide), chromium oxide, manganese oxide, titanium oxide, zinc carbonate, calcium oxide, calcium silicate, magnesium sulfide, calcium tungstate (scheelite), tungsten oxide, nickel oxide, rock wool, titanium carbide, silicon carbide, silicon dioxide (silica), aluminum oxide, glass fibers, alumina ceramic fibers, alumina-silica ceramic fibers, mullite, alumina-silica-zirconia ceramic fibers, tungsten carbide and silicon nitride. It is advantageous for up to 50 wt % of the abrasive to be an inorganic substance having a Mohs hardness of at least 6.5. The non-asbestos friction material is typically used in combination with a rotor or drum having a mating surface that comes into contact with the friction material and is made of a material selected from among cast iron, cast steel and stainless steel.

DETAILED DESCRIPTION OF THE INVENTION

The friction material composition used to form the non-asbestos friction material of the invention includes a fibrous base other than asbestos, a binder, an organic filler, and an inorganic filler.

Exemplary fibrous bases include inorganic fibers other than asbestos, organic fibers and metal fibers that are commonly employed in friction materials. Suitable organic fibers include nylon, polyester, rayon, phenolic fibers and aramid fibers. Suitable inorganic fibers include potassium titanate whiskers, rock wool, wollastonite, sepiolite, attapulgite and glass fibers. Suitable metal fibers include iron, copper, brass, bronze and aluminum fibers. These fibrous bases may be used singly or as combinations of two or more thereof.

The fibrous base is used in the form of short fibers or a powder and is included in an amount of preferably 1 to 50 vol %, and most preferably 3 to 30 vol %, based on the overall friction material composition.

The binder may be any known binder commonly used in friction materials. Illustrative examples include phenolic resins, melamine resins, epoxy resins, various types of modified phenolic resins (e.g., silicone-modified phenolic resins, acrylic-modified phenolic resins, epoxy-modified phenolic resins, oil-modified phenolic resins, alkylbenzene-modified phenolic resins, cashew-modified phenolic resins), and acrylonitrile-butadiene rubber. Any one or combinations of two or more of these may be used.

The binder is included in an amount of preferably 5 to 30 vol %, and most preferably 10 to 25 vol %, based on the overall friction material composition.

Illustrative examples of the organic filler include cashew dust, rubber powders of various types (e.g., rubber dust, melamine dust), and tire powder. Any one or combination of two or more thereof may be used.

The organic filler is included in an amount of preferably 5 to 25 vol %, and most preferably 10 to 20 vol %, based on the overall frictional material composition.

The inorganic filler is typically a substance which has a Mohs hardness of less than 4.5 and is not among the abrasives to be described later. Illustrative examples include molybdenum disulfide, antimony trisulfide, calcium carbonate, barium sulfate, magnesium sulfate, graphite, calcium hydroxide, slaked lime, calcium fluoride, talc, iron sulfide, zinc sulfide and metal powder. Any one or combination of two or more thereof may be used.

The inorganic filler is included in an amount of preferably 10 to 60 vol %, and most preferably 20 to 40 vol %, based on the overall friction material composition.

According to the invention, the friction material composition further includes an abrasive. The abrasive generally has a Mohs hardness of at least 4.5, and preferably at least 5, and is of a greater hardness than the material of which the mating surface in frictional cooperation is made. However, the abrasive may have a Mohs hardness of less than 4.5, provided at least 50 wt %, and preferably at least 70 wt %, of the abrasive is made up of components such as oxides which have a Mohs hardness of at least 4.5, and preferably at least 5, and are harder than the mating surface. For example, vermiculite ($SiO_2$, 40 wt %; $Al_2O_3$, 10 wt %; $Fe_2O_3$, 5 wt %; MgO, 25 wt %; etc.), hard mica ($SiO_2$, 45 wt %; $Al_2O_3$, 34 wt %; etc.) and soft mica ($SiO_2$, 40 wt %; $Al_2O_3$, 23 wt %; MgO, 21 wt %; etc.) each have a Mohs hardness of less than 4.5, but they serve as the abrasive in the invention because they include at least 50 wt % of oxides having a Mohs hardness of at least 4.5, and preferably at least 5, and having a greater Mohs hardness than the mating surface. That is, it has been found that when these substances are used as the abrasive, behavior such as improved action and increased squeal that is attributable to the oxides and other hard components within the abrasive impart the abrasive with a behavior akin to that of abrasives having a Mohs hardness of at least 4.5, and especially at least 5. Accordingly, when the content of such oxides and other hard constituents in the abrasive is at least 50 wt %, the hardness of those components serves in effect as the hardness of the abrasive component.

The abrasive used herein may be fibrous or granular, so long as it is an inorganic substance (including metals) that fits the foregoing definition and has an abrasive action. The size of the particles or fibers of abrasive is typically 0.5 to 5000 μm, and especially 1 to 3000 μm. Specifically, fibrous abrasive has a length of preferably 5 to 3000 μm, granular abrasive has a particle size of preferably 0.5 to 500 μm, and flaky abrasive has a length of preferably 1 to 1000 μm.

In the practice of the invention, the foregoing abrasive differs from the earlier-described inorganic filler but may encompass inorganic substances serving as the fibrous base that fit the above definition of the abrasive. For example, ceramic fibers (e.g., $Al_2O_3$, $Al_2O_3.SiO_2$, $Al_2O_3.SiO_2.MgO$, $Al_2O_3.SiO_2.ZrO_2$), glass fibers (e.g., $Al_2O_3.BO.SiO_2$), rock wool ($Al_2O_3.SiO_2.CaO.MgO$), wollastonite ($CaO.SiO_2$) and mullite ($Al_2O_3.SiO_2$) all have a Mohs hardness of 4.5 or more, and thus may serve as the abrasive.

Specific examples of suitable abrasives include zirconium oxide, zirconium silicate, triiron tetraoxide, magnetite, vermiculite, mica, stannic oxide, magnesium oxide (magnesia), iron sulfide, pyrite, ferric oxide (red iron oxide), chromium oxide, manganese oxide, titanium oxide, zinc carbonate, calcium oxide, calcium silicate, magnesium sulfide, calcium tungstate (scheelite), tungsten oxide, nickel oxide, rock wool, titanium carbide, silicon carbide, silicon dioxide (silica), aluminum oxide, glass fibers, alumina ceramic fibers, alumina-silica ceramic fibers, mullite, alumina-silica-zirconia ceramic fibers, tungsten carbide and silicon nitride. The substances shown in Table 1 below may also be effectively used as the abrasive.

TABLE 1

| Glass fibers | $SiO_2 \cdot CaO \cdot Al_2O_3 \cdot B_2O_3$ | E glass |
|---|---|---|
| Glass fibers | $SiO_2 \cdot CaO \cdot Al_2O_3 \cdot Fe_2O_3$ | |
| Glass fibers | $SiO_2 \cdot CaO \cdot Al_2O_3 \cdot MgO \cdot Na_2O$ | C glass |
| Ceramic fibers | $Al_2O_3$ | |
| Ceramic fibers | $Al_2O_3 \cdot SiO_2$ | Bulk fiber |
| Ceramic fibers | $Al_2O_3 \cdot SiO_2 \cdot ZrO_2$ | Z bulk fiber |
| Vermiculite | $SiO_2 \cdot MgO \cdot Al_2O_3 \cdot Fe_2O_3$ | |
| Wollastonite | $SiO_2 \cdot CaO \cdot Al_2O_3 \cdot Fe_2O_3$ | |
| Hard mica | $SiO_2 \cdot Al_2O_3 \cdot K_2O$ | |
| Soft mica | $SiO_2 \cdot Al_2O_3 \cdot MgO$ | a natural metal mica (phlogopite) |
| Soft mica | $SiO_2 \cdot Al_2O_3$ MgO $\cdot K_2O \cdot FeO$ | suzorite |
| Phyllite | $SiO_2 \cdot Al_2O_3 \cdot Fe_2O_3$ | |
| Rock wool | $SiO_2 \cdot CaO \cdot Al_2O_3 \cdot MgO$ | |
| Rock wool | $SiO_2 \cdot CaO \cdot Al_2O_3 \cdot MgO \cdot FeO$ | |

The friction material composition used in the invention preferably contains at least two, and most preferably two to five, of the above-mentioned types of abrasives which have mutually differing Mohs hardnesses. It is especially preferable to use one or more first abrasive selected from among inorganic substances having a Mohs hardness of less than 6.5 with one or more second abrasive selected from among inorganic substances having a Mohs hardness of at least 6.5, preferably 6.5 to 10, and most preferably 6.5 to 7.2. Suitable examples include a combination of vermiculite with black iron oxide ($Fe_3O_4$) and $SiO_2$, a combination of vermiculite with mica, black iron oxide and $SiO_2$, a combination of vermiculite with mica, black iron oxide and ceramic fibers, a combination of mica with black iron oxide and $SiO_2$, a combination of vermiculite with mica, black iron oxide and zirconium oxide, and a combination of vermiculite with mica, black iron oxide and alumina.

The second abrasive accounts for preferably up to 50 wt %, and most preferably 1 to 25 wt %, of the overall abrasive. More than 50 wt % of the second abrasive may result in greater tendency for squeal and exacerbate attack of the mating surface. On the other hand, less than 1 wt % may make it impossible to achieve sufficient ease of rust removal.

In the practice of the invention, it is critical for the friction material composition to contain a total amount of organic substances (which is the combined amount of organic fibers, binder, and organic filler) and a total amount of abrasive in a volumetric ratio (i.e., total organics/total abrasive) of 1.5/1 to 3.5/1, and preferably 2/1 to 3.5/1. A volumetric ratio of total organics to total abrasive which is greater or lower than the above range results in a number of drawbacks, including an increased tendency for the generation of undesirable noise, a decline in the ease of rust removal from the mating surface, an increased tendency for squeal, excessive attack of the mating surface, and diminished wear resistance. Such drawbacks make it impossible to achieve the desired objects, features and advantages of the invention.

The method of making the non-asbestos friction material of the invention involves uniformly blending given amounts of the above-described components in a suitable mixer such as a Henschel mixer, Loedige mixer or Eirich mixer, and preforming the blend in a mold. The preform is then molded at a temperature of 130 to 200° C. and a pressure of 10 to 100 MPa for a period of 2 to 10 minutes. The resulting molded article is typically postcured by heat treatment at 140 to 250° C. for a period of 2 to 48 hours, then spray-painted, baked and surface-ground as needed to give the finished article.

The non-asbestos friction material of the invention can be used in a variety of related applications, including disk brake pads, drum brake shoes, clutch disks and brake blocks in brakes and clutches for automobiles, large trucks, railroad cars and various types of industrial machinery. They are particularly well-suited for applications involving use in combination with a rotor or drum in which the mating surface that comes into contact with the friction material is made of a material selected from among cast iron, cast steel and stainless steel.

EXAMPLES

Examples and comparative examples are given below by way of illustration, and are not intended to limit the invention.

Examples 1 to 11, and Comparative Examples 1 and 2

Friction material compositions formulated as shown in Tables 2 and 3 were uniformly blended in a Loedige mixer and preformed in a pressure mold under a pressure of 10 MPa for 1 minute. The preforms were molded for the desired length of time at a temperature and pressure of 160° C. and 25 MPa, then postcured by 5 hours of heat treatment at 200° C., yielding automotive brake pads in each example.

The brake pads obtained in Examples 1 to 11 and in Comparative Examples 1 and 2 were subjected to brake squeal and judder tests and wear tests by the methods described below. The results are presented in Tables 2 and 3.

Brake Squeal and Judder Tests (According to JASO C402)

The incidence of brake squeal and the incidence of judder during braking were rated as follows in a road vehicle test using a rotor (rotor material, FC200) available as genuine maintenance part for the test vehicle having the mating surface with a Mohs hardness of 4 to 4.5). Values shown below indicate the incidence.

Very Good: 1% or less

Good: 3% or less

Fair: less than 10%

Poor: 10% or more

Wear Test (According to JASO C406)

Test conditions were initial braking speed, 50 km/h; braking deceleration, 0.15 g; number of braking cycles, 1,000; brake temperature before braking, 150° C. The degree of wear on the mating surface of a rotor was rated as follows using a genuine maintenance part (rotor material, FC200) for the test vehicle (the mating surface's Mohs hardness, 4 to 4.5).

Very Good: slight wear (less than 100 $\mu$m)

Good: modest wear (100 to 200 $\mu$m)

Fair: substantial wear (200 to 300 $\mu$m)

Poor: severe wear (more than 300 $\mu$m)

TABLE 2

| | Example | | | | | | | |
|---|---|---|---|---|---|---|---|---|
| | 1 | 2 | 3 | 4 | 5 | 6 | 7 | 8 |
| Organic substances | | | | | | | | |
| Phenolic resin | 20 | 18 | 18 | 18 | 18 | 18 | 18 | 18 |
| Aramid fibers | 5 | 4 | 4 | 4 | 4 | 4 | 4 | 4 |
| Cashew dust | 12 | 12 | 12 | 12 | 9 | 9 | 9 | 9 |
| Tire powder | 3 | 3 | 3 | 3 | 3 | 3 | 3 | 3 |
| Abrasives | | | | | | | | |
| Vermiculite | 3 | 4 | 4 | 4 | 4 | 2 | 8 | — |
| Mica | 3 | 4 | 4 | 4 | 4 | 2 | — | 4 |
| Black iron oxide | 3 | 4 | 6 | 8 | 8 | 3 | 3 | 3 |
| Ceramic fibers | — | — | — | — | — | — | — | — |
| Alumina | — | — | — | — | — | — | — | — |
| Zirconium oxide | — | — | — | — | — | — | — | — |
| $SiO_2$ | 3 | 3 | 3 | 3 | 3 | 8 | 8 | 12 |
| Others | | | | | | | | |
| Potassium titanate | 10 | 10 | 10 | 10 | 10 | 13 | 10 | 10 |
| Calcium hydroxide | 2 | 2 | 2 | 2 | 2 | 2 | 2 | 2 |
| Barium sulfate | 23 | 23 | 21 | 19 | 22 | 23 | 22 | 22 |
| Copper fibers | 5 | 5 | 5 | 5 | 5 | 5 | 5 | 5 |
| Graphite | 8 | 8 | 8 | 8 | 8 | 8 | 8 | 8 |
| Total (vol%) | 100 | 100 | 100 | 100 | 100 | 100 | 100 | 100 |
| Total amount of organic substances | 40 | 37 | 37 | 37 | 34 | 34 | 34 | 34 |

TABLE 2-continued

|  | Example | | | | | | | |
|---|---|---|---|---|---|---|---|---|
|  | 1 | 2 | 3 | 4 | 5 | 6 | 7 | 8 |
| Total amount of abrasives | 12 | 15 | 17 | 19 | 19 | 15 | 19 | 19 |
| Total organics/total abrasives | 3.33 | 2.47 | 2.18 | 1.95 | 1.79 | 2.27 | 1.79 | 1.79 |
| Squeal | very good | good | good | good | good | fair | fair | fair |
| Judder | good | good | good | good | very good | good | good | very good |
| Wear test | very good | good | good | fair | fair | good | fair | fair |

TABLE 3

|  | Example | | | Comparative Example | |
|---|---|---|---|---|---|
|  | 9 | 10 | 11 | 1 | 2 |
| Organic substances | | | | | |
| Phenolic resin | 20 | 20 | 20 | 18 | 20 |
| Aramid fibers | 5 | 5 | 5 | 3 | 6 |
| Cashew dust | 12 | 12 | 12 | 5 | 15 |
| Tire powder | 3 | 3 | 3 | 2 | 6 |
| Abrasives | | | | | |
| Vermiculite | 3 | 3 | 3 | 4 | 4 |
| Mica | 3 | 3 | 3 | 4 | 3 |
| Black iron oxide | 3 | 3 | 3 | 8 | 3 |
| Ceramic fibers | 3 | — | — | — | — |
| Alumina | — | — | 3 | — | — |
| Zirconium oxide | — | 3 | — | — | — |
| SiO$_2$ | — | — | — | 5 | 2 |
| Others | | | | | |
| Potassium titanate | 10 | 10 | 10 | 15 | 10 |
| Calcium hydroxide | 2 | 2 | 2 | 2 | 2 |
| Barium sulfate | 23 | 23 | 23 | 21 | 16 |
| Copper fibers | 5 | 5 | 5 | 5 | 5 |
| Graphite | 8 | 8 | 8 | 8 | 8 |
| Total (vol %) | 100 | 100 | 100 | 100 | 100 |
| Total amount of organic substances | 40 | 40 | 40 | 28 | 47 |
| Total amount of abrasives | 12 | 12 | 12 | 21 | 12 |
| Total organics/total abrasives | 3.33 | 3.33 | 3.33 | 1.33 | 3.92 |
| Squeal | very good | fair | fair | poor | very good |
| Judder | good | fair | fair | very good | poor |
| Wear test | very good | good | good | poor | good |

In Tables 2 and 3, the amount of each component is given in volume percent based on the overall friction material composition. The abrasives are described in further detail below.

Abrasives

Vermiculite: Mohs hardness, 2 to 3; average particle size, 500 μm
Mica: Mohs hardness, 1 to 2; average particle size, 300 μm
Black iron oxide: Mohs hardness, 5.5 to 6.4; average particle size, 20 μm
Ceramic fibers: Mohs hardness, 6.5; alumina-silica-zirconia amorphous short fibers (Al$_2$O$_3$.SiO$_2$.ZrO$_2$); average fiber length, 150 μm
Alumina: Mohs hardness, 9; average particle size, 10 μm
Zirconium oxide: Mohs hardness, 7.5; average particle size, 30 μm
SiO$_2$: Mohs hardness, 7; average particle size, 40 μm As is apparent from the results shown in Tables 2 and 3, the friction material obtained in Comparative Example 1 had a total organics/total abrasives ratio of 1.33 and exhibited a very high incidence of squeal. The friction material obtained in comparative Example 2 had a total organics/total abrasives ratio of 3.92 and exhibited a very high incidence of judder during braking. Both of these friction materials had serious drawbacks in practical use.

By contrast, each of the friction materials obtained in Examples 1 to 11 of the invention had a low incidence of squeal, a low incidence of judder, and excellent wear resistance.

The non-asbestos friction materials of the invention have many benefits including (1) low incidence of judder (low-frequency noise) during braking, (2) good rust removal from the rotor, (3) low incidence of brake squeal, (4) minimal attack to mating surface, and (5) good wear resistance.

Japanese Patent Application No. 2001-043166 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A non-asbestos friction material made by molding and curing a composition comprising:
   a fibrous base o her than asbestos,
   a binder,
   an organic filler,
   an inorganic filler, and
   an abrasive composed of (i) an inorganic substance having a Mohs hardness of less than 4.5 and containing at least 50 wt % of a component having a Mohs hardness of at least 4.5, and (ii) an inorganic substance having a Mohs hardness of at least 6.5;
   wherein a total amount of organic substances and a total amount of abrasive are in a volumetric ratio of 1.5/1 to 3.5/1.

2. The non-asbestos friction material of claim 1, wherein said inorganic substance having a Mohs hardness of less than 4.5 and containing at least 50 wt % of a component having a Mohs hardness of at least 4.5 is vermiculite and/or mica.

3. The non-asbestos friction material of claim 1, wherein said inorganic substance having a Mohs hardness of at least 6.5 is selected from ceramic fibers, alumina, zirconium oxide and SiO$_2$.

4. The non-asbestos friction material of claim 1, wherein said inorganic substance having a Mohs hardness of at least 6.5 is contained in an amount of up to 50% by weight of the overall abrasive.

5. The non-asbestos friction material of claim 1, wherein said abrasive further contains (iii) an inorganic substance having a Moh hardness of 5.5 to 6.4.

6. The non-asbestos friction material of claim 5, wherein said inorganic substance having a Mohs hardness of 5.5 to 6.4 is triiron tetraoxide (Black iron oxide).

7. A brake comprising:
   A. a rotor or drum having a mating surface of a material selected from the group consisting of cast iron, cast steel and stainless steel; and
   B. the non-asbestos friction material of any one of claims 1 to 5 adapted to frictionally engage said mating surface.

8. The non-asbestos friction material of claim 1, wherein the inorganic substance has a Mohs hardness of less than 4.5 as a whole and containing at least 50 wt % of an oxide having a Mohs hardness of at least 4.5 therein.

* * * * *